July 7, 1959     H. W. MULCAHY     2,893,569
DRAFT GEARS FOR RAILWAY DRAFT RIGGING Filed June 15, 1956     2 Sheets-Sheet 1

Inventor:
Harry W. Mulcahy.
By George H. Simmons
Edward F. Jurow
Atty.

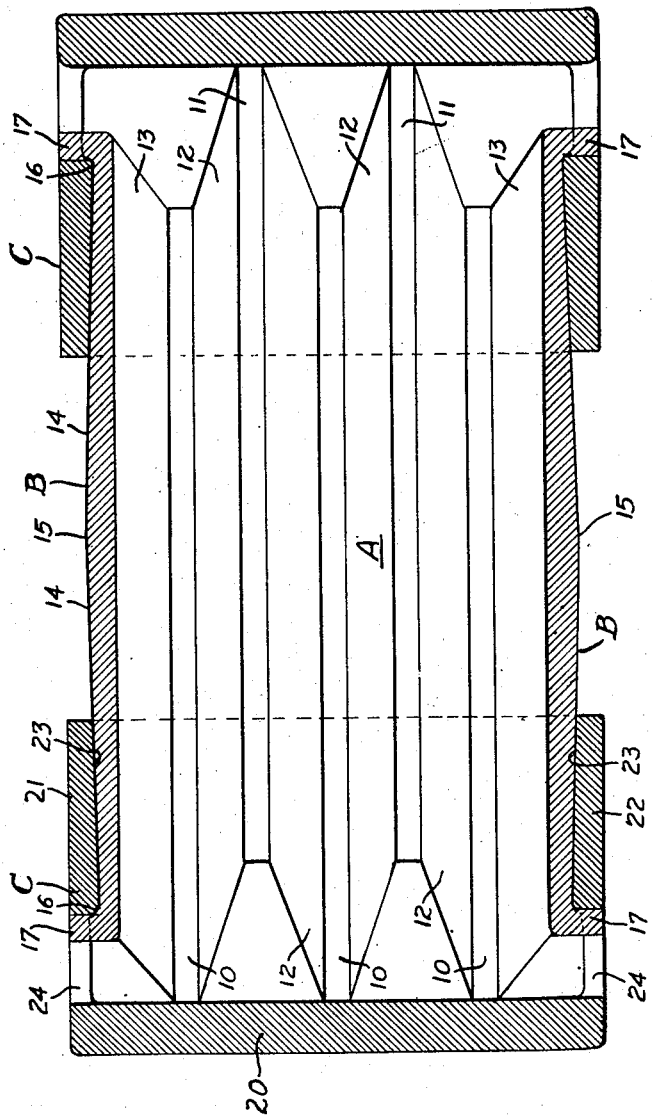

United States Patent Office 2,893,569
Patented July 7, 1959

2,893,569

DRAFT GEARS FOR RAILWAY DRAFT RIGGING

Harry W. Mulcahy, Chicago, Ill., assignor to W. H. Miner, Inc., Chicago, Ill., a corporation of Delaware Application June 15, 1956, Serial No. 591,744

1 Claim. (Cl. 213—44)

This invention relates to draft gears for railway draft rigging.

It is a main object of the invention to provide a rubber friction draft gear in which the rubber is stressed simultaneously in shear and compression during operation of the gear.

Another object of the invention is to provide a rubber friction draft gear which is a self-contained unit of simple design and employing a minimum number of parts.

Another object of the invention is to provide a rubber friction draft gear in which the rubber is stressed primarily in shear and secondarily in compression during operations of the gear.

Further objects of the invention not specifically mentioned here will be apparent from the detailed description and claims which follow, reference being had to the accompanying drawings in which a preferred embodiment of the invention is shown by way of example and in which:

Figure 2 is a cross sectional view taken along a horizontal plane through the center of the gear, the rubber masses and intervening plates being shown in full.

Figure 1:
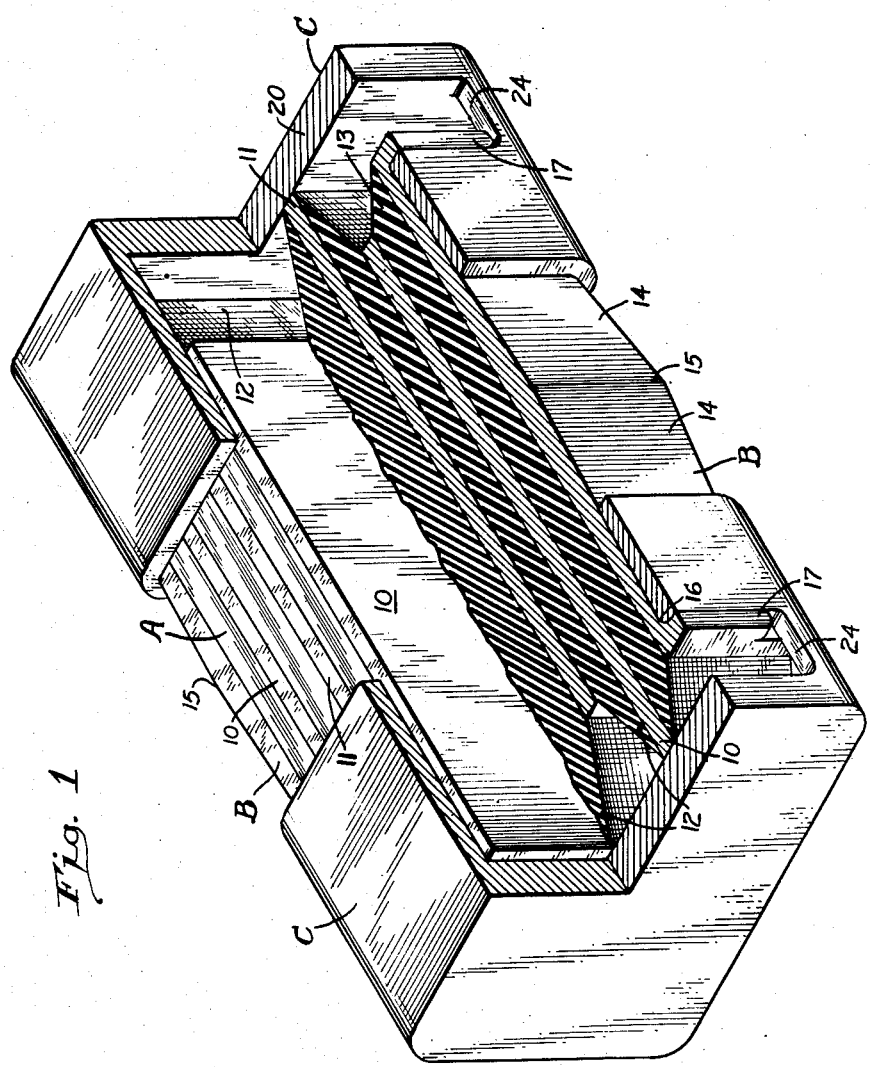
Figure 1 is a perspective view in quarter section of the gear.

The draft gear of the present invention consists of a resilient unit A, on the opposite sides of which friction plates B are disposed and held by end caps C.

In the embodiment of the invention shown in Figures 1 and 2, the resilient unit A consists of alternate rectangular metal plates 10 offset longitudinally with respect to intervening plates 11, and masses of rubber 12 disposed between and bonded to the adjacent ones of the plates 10 and 11. Disposed on opposite sides of the unit are friction plates B, and masses of rubber 13 are disposed between and bonded to the outermost plates 10 and the friction plates B.

Each friction plate has an outer surface 14 which tapers from a high point 15 at the middle of the plate to thinner points 16 at the ends thereof. Projecting outwardly from the ends of the friction plate are lugs 17.

The end caps C are identical, each consisting of an end wall 20 disposed transversely of the longitudinal axis of the gear, from the edges of which wall 20 flangelike top, bottom and side walls are projected for a distance to provide an internal length which will be less than one-half the length of a rectangular plate 10 or 11. The side walls 21 and 22 of the cap have inner edges 23 which are tapered to have slope corresponding to the slope of the friction plates B. Each of the side walls 21 and 22 contains a slot 24 disposed adjacent the end wall of the cap and extending forwardly therefrom, into which slot the lugs 17 on the friction plate B project to secure the gear together as a unit.

It will be noted that the resilient unit A, consisting of plates 10 and 11, and the intervening masses of rubber 12 are all bonded together as a unitary structure. The plates 10 and 11 are sufficiently thick to resist loads in excess of draft gear capacity for a purpose presently to appear.

In assembling the gear, pressure is applied to the friction plates B along the transverse axis of the gear sufficient in amount to compress the masses of rubber 12 therein sufficiently to permit the end caps C to telescope over the lugs 17 on the friction plates. Pressure is then applied to the end walls 20 of the end caps C, decreasing the offset of the plates 10 and 11 to build up in the masses of rubber 12 initial resistance required of the gear. When the end caps have been moved sufficiently close together to register the lugs 17 with the slots 24 in the end caps, the laterally applied pressure is relieved, allowing the resilient unit A to expand laterally, thereby to move the lugs 17 into the slots and to engage the tapered surfaces 23 of the end caps with the tapered surfaces 14 of the friction plate. Pressure is then removed from the longitudinal axis of the gear to complete the assembly and position the parts in the position shown in the drawings. Sufficient compressive strains remain in the resilient unit A to exert a force against the friction plates B producing an initial frictional resistance to closure of the gear.

In operation of the gear, pressure applied to the end walls 20 of the end caps C forces these caps towards each other against the shear resistance of the resilient unit A and the frictional resistance between the friction plates B and the end caps C. This movement can continue until the forward ends of the friction plates B and intervening plates 11 are brought into registration with the rear face of the end wall 20 of the front cap and until the rear end of the friction plates B and alternate plates 10 are registered with the front face of the end wall 20 of the rear cap. When this condition occurs, further stressing of the masses of rubber 12 is prevented. Since the plates 10 and 11 are quite thick, further pressure applied to the end wall is resisted by these plates and the friction plates B. Upon release of the pressures moving the end caps towards each other, the gear restores to the position shown in the drawings.

It will be readily apparent that with the friction plates B having but slight taper, as shown in the drawings, the major portion of the resistance of the gear is achieved through stressing the masses of rubber 12 in shear, with a secondary resistance due to compressive forces exerted against the friction plates to increase the friction between the friction plates and the end caps. This secondary resistance is enhanced as the side walls of the end cap move the friction plates inwardly of the gear. The ratio between shear stresses and compression stresses can be varied by varying the degree of taper of the friction plates and end cap surfaces engaged therewith.

During the first half of the gear travel shear resistance is provided only by the central four masses of rubber 12, 12, 12, 12, and during the latter half of the travel of the gear by the entire six rubber masses 12. 12, 12, 12, 13 and 13. Frictional resistance is developed between the outer surfaces of the friction shoes B and the friction surfaces 23 of the housing C. It will be appreciated that these factors permit variations, within limits, whereby the capacity or operation of the gear may be changed quite readily.

While I have chosen to show my invention by illustrating and describing a preferred embodiment, I have done so by way of example only, as there are many modifications and adaptations which can be made by one skilled in the art within the teachings of the invention.

Having thus complied with the statutes and shown and described my invention, what I consider new and desire to have protected by Letters Patent is pointed out in the appended claim.

What I claim is:

A rubber friction draft gear comprising: a plurality of spaced apart metal plates disposed parallel to each other and extending longitudinally of the gear, alternate ones of said plates being offset with respect to the intervening plates, the outer surfaces of the outer ones of said plates tapering from thicker portions at the centers of the plates to thinner portions at the front and rear ends thereof; lugs projecting outwardly from said outer plates at the ends thereof; a plurality of rubber pads, each pad being disposed between and bonded to an adjacent pair of said plates; a front cap for said gear, having a front wall against the rear face of which the offset ends of the alternate plates abut and rearwardly extending walls projecting from the edges of said front wall, the side wall portions of said rearwardly extending walls containing slots elongated longitudinally of the gear and into which the lugs at the front ends of the outer plates project; and a rear cap for said gear, having a rear wall against the front face of which the offset ends of the intervening plates abut and forwardly extending walls projecting from the edges of said rear wall, the side wall portions of said rearwardly extending walls containing slots elongated longitudinally of the gear and into which the lugs at the rear ends of the outer plates project, said end caps having an internal length less than one-half the length of an inner plate.

References Cited in the file of this patent
UNITED STATES PATENTS

| | | |
|---|---|---|
| 2,165,375 | Heitner | July 11, 1939 |
| 2,328,878 | Gallagher | Sept. 7, 1943 |
| 2,618,393 | Withall | Nov. 18, 1952 |
| 2,733,915 | Dentler | Feb. 7, 1956 |